(12) United States Patent
Nishioka et al.

(10) Patent No.: US 7,100,831 B2
(45) Date of Patent: Sep. 5, 2006

(54) METHOD AND APPARATUS FOR PROCESSING READ-OUT IMAGES

(75) Inventors: Yukinori Nishioka, Kaisei-machi (JP); Masato Some, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 52 days.

(21) Appl. No.: 10/420,934

(22) Filed: Apr. 23, 2003

(65) Prior Publication Data

US 2004/0020987 A1    Feb. 5, 2004

(30) Foreign Application Priority Data

Apr. 23, 2002   (JP) .............................. 2002/120109

(51) Int. Cl.
*G06K 7/10*   (2006.01)
(52) U.S. Cl. .................... 235/462.29; 235/462.33; 235/462.25
(58) Field of Classification Search .......... 235/462.01, 235/462.25, 462.26, 462.27, 462.29, 462.33, 235/462.36, 462.38
See application file for complete search history.

(56) References Cited

U.S. PATENT DOCUMENTS

| | | | |
|---|---|---|---|
| 4,889,990 A | 12/1989 | Hosoi et al. | |
| 4,954,913 A | 9/1990 | Kajita | |
| 5,028,793 A | 7/1991 | Lindmayer et al. | |
| 5,770,847 A * | 6/1998 | Olmstead ................ | 235/462.35 |
| 6,002,492 A | 12/1999 | Kamon et al. | |
| 6,123,262 A * | 9/2000 | Shellhammer ......... | 235/462.09 |
| 6,144,778 A | 11/2000 | Beauchamp et al. | |
| 6,603,572 B1 | 8/2003 | Nakatani et al. | |
| 6,650,441 B1 | 11/2003 | Horigome et al. | |

FOREIGN PATENT DOCUMENTS

| | | |
|---|---|---|
| EP | 0 901 273 A2 | 3/1999 |
| EP | 0 942 587 A2 | 9/1999 |
| GB | 2246197 A | 1/1992 |
| JP | 59-15843 | 1/1984 |
| JP | 61-93538 | 5/1986 |
| JP | 63-211966 A | 9/1988 |
| JP | 01-293073 A | 11/1989 |
| JP | 1-60782 | 12/1989 |
| JP | 1-60784 | 12/1989 |
| JP | 4-3952 | 1/1992 |
| JP | 10-28200 A | 1/1998 |
| JP | 2000-115478 A | 4/2000 |

\* cited by examiner

*Primary Examiner*—Karl D. Frech
(74) *Attorney, Agent, or Firm*—Sughrue Mion, PLLC

(57) ABSTRACT

A scanning device or a light beam is moved for reciprocal scanning with respect to an image carrier, which carries image information thereon, and in a main scanning direction. The scanning device or the light beam is also moved with respect to the image carrier and in a sub-scanning direction intersecting with the main scanning direction. Light, which comes from the image carrier, is photoelectrically converted into an electric image signal. Smoothing operation processing is performed on forward scanning image signal components and backward scanning image signal components, which have been acquired respectively in a forward scanning stage and a backward scanning stage consecutive in the reciprocal scanning, and with respect to the sub-scanning direction.

17 Claims, 9 Drawing Sheets

FIG.9

|    | U1 | U2 | U3  | U4  | U5  | U6  | U7  | U8 | U9 | U10 |
|----|----|----|-----|-----|-----|-----|-----|----|----|-----|
| R1→|    |    | 0   | 100 | 100 | 100 | 100 | 2  | 0  | 0   |
| L1→| 0  | 2  | 0   | 100 | 100 | 100 | 100 | 0  |    |     |
| R2→|    |    | 0   | 100 | 100 | 100 | 100 | 10 | 12 | 0   |
| L2→| 0  | 10 | 12  | 100 | 100 | 100 | 100 | 0  |    |     |
| R3→|    |    | 0   | 100 | 100 | 100 | 100 | 0  | 2  | 0   |
| L3→| 0  | 0  | 2   | 100 | 100 | 100 | 100 | 0  |    |     |

FIG.10A

|    | V1 | V2 | V3  | V4  | V5  | V6  | V7  | V8 |
|----|----|----|-----|-----|-----|-----|-----|----|
| R1 | 0  | 100| 100 | 100 | 100 | 2   | 0   | 0  |
| L1 | 0  | 2  | 0   | 100 | 100 | 100 | 100 | 0  |
| R2 | 0  | 100| 100 | 100 | 100 | 10  | 12  | 0  |
| L2 | 0  | 10 | 12  | 100 | 100 | 100 | 100 | 0  |
| R3 | 0  | 100| 100 | 100 | 100 | 0   | 2   | 0  |
| L3 | 0  | 0  | 2   | 100 | 100 | 100 | 100 | 0  |

|    | V1 | V2 | V3 | V4  | V5  | V6 | V7 | V8 |
|----|----|----|----|-----|-----|----|----|----|
| K1 | 0  | 51 | 50 | 100 | 100 | 51 | 50 | 0  |
| K2 | 0  | 51 | 50 | 100 | 100 | 55 | 56 | 0  |
| K3 | 0  | 55 | 56 | 100 | 100 | 55 | 56 | 0  |
| K4 | 0  | 55 | 56 | 100 | 100 | 50 | 51 | 0  |
| K5 | 0  | 50 | 51 | 100 | 100 | 50 | 51 | 0  |
| K6 | 0  | 50 | 50 | 100 | 100 | 50 | 50 | 0  |

|    | V1 | V2 | V3 | V4  | V5  | V6 | V7 | V8 |
|----|----|----|----|-----|-----|----|----|----|
| W1 | 0  | 2  | 0  | 100 | 100 | 2  | 0  | 0  |
| W2 | 0  | 6  | 6  | 100 | 100 | 6  | 6  | 0  |
| W3 | 0  | 10 | 12 | 100 | 100 | 10 | 12 | 0  |
| W4 | 0  | 5  | 7  | 100 | 100 | 5  | 7  | 0  |
| W5 | 0  | 0  | 2  | 100 | 100 | 0  | 2  | 0  |
| W6 | 0  | 2  | 4  | 100 | 100 | 2  | 3  | 0  |

METHOD AND APPARATUS FOR PROCESSING READ-OUT IMAGES

BACKGROUND OF THE INVENTION

1. Field of the Invention

This invention relates to a method and apparatus for processing a read-out image. This invention particularly relates to a method and apparatus for processing a read-out image, wherein scanning means is moved for reciprocal scanning with respect to an image carrier, which carries image information thereon, and an image signal representing the image information is acquired.

2. Description of the Related Art

It has been proposed to use stimulable phosphors as radiation detecting materials in radiation image diagnosing systems. Specifically, energy from radiation carrying image information of an object is stored and recorded on a stimulable phosphor, which is contained in a stimulable phosphor layer of a stimulable phosphor sheet. The stimulable phosphor layer of the stimulable phosphor sheet, on which the radiation image information has been stored, is then exposed to an electromagnetic wave acting as stimulating rays, which cause the stimulable phosphor to emit light in proportion to the amount of energy stored on the stimulable phosphor during its exposure to the radiation. The light emitted by the stimulable phosphor, upon stimulation thereof, is photoelectrically detected and converted into a digital image signal. The digital image signal is then processed and used for the reproduction of the radiation image information of the object as a visible image on a recording material.

Also, it has been proposed to use stimulable phosphors as radiation detecting materials in autoradiography image detecting systems. Specifically, a substance imparted with a radioactive label is administered to an organism, and the organism or part of a tissue of the organism is taken as a sample. The sample and a stimulable phosphor sheet provided with a stimulable phosphor layer are superposed one upon the other for a predetermined length of time, and energy from the radiation emitted by the radioactive label contained in the sample is thus stored on the stimulable phosphor contained in the stimulable phosphor layer of the stimulable phosphor sheet. The stimulable phosphor layer of the stimulable phosphor sheet, on which the radiation image information of the sample has been stored, is then exposed to an electromagnetic wave acting as stimulating rays, which cause the stimulable phosphor to emit light in proportion to the amount of energy stored on the stimulable phosphor during its exposure to the radiation. The light emitted by the stimulable phosphor, upon stimulation thereof, is photoelectrically detected and converted into a digital image signal. The digital image signal is then processed and used for the reproduction of the radiation image information of the sample as a visible image on a recording material. The autoradiography image detecting systems are disclosed in, for example, Japanese Patent Publication Nos. 1(1989)-60782, 1(1989)-60784, and 4(1992)-3952.

Further, it has been proposed to use stimulable phosphors as light detecting materials in chemiluminescence image detecting systems, the stimulable phosphors having the characteristics such that the stimulable phosphors absorb and store energy from light during exposure to the light and, when the stimulable phosphors are then stimulated by an electromagnetic wave having wavelengths falling within a specific wavelength range, the stimulable phosphors emit light in proportion to the amount of energy stored on the stimulable phosphors during the exposure of the stimulable phosphors to the light. Specifically, a biopolymer whose protein sequence, nucleic acid sequence, or the like, has been fixed is selectively labeled with a labeling substance capable of producing chemiluminescence when being brought into contact with a chemiluminescence substrate. The biopolymer having thus been selectively labeled with the labeling substance capable of producing the chemiluminescence is then brought into contact with the chemiluminescence substrate. Also, energy from the chemiluminescence having wavelengths falling within the visible light wavelength range, which chemiluminescence is produced by the labeling substance when the labeling substance is thus brought into contact with the chemiluminescence substrate, is stored on the stimulable phosphor contained in the stimulable phosphor layer of the stimulable phosphor sheet. Thereafter, the stimulable phosphor layer of the stimulable phosphor sheet, on which the chemiluminescence image information of the biopolymer has been stored, is then exposed to an electromagnetic wave acting as stimulating rays, which cause the stimulable phosphor to emit light in proportion to the amount of energy stored on the stimulable phosphor during its exposure to the chemiluminescence. The light emitted by the stimulable phosphor, upon stimulation thereof, is photoelectrically detected and converted into a digital image signal. The digital image signal is then processed and used for the reproduction of the chemiluminescence image information of the biopolymer as a visible image on a recording material. The chemiluminescence image detecting systems are disclosed in, for example, U.S. Pat. No. 5,028,793 and British Patent Publication GB No. 2,246,197A.

Furthermore, it has been proposed to use stimulable phosphors as electron beam detecting materials in electron microscope image detecting systems, the stimulable phosphors having the characteristics such that the stimulable phosphors absorb and store energy from an electron beam during exposure to the electron beam and, when the stimulable phosphors are then stimulated by an electromagnetic wave having wavelengths falling within a specific wavelength range, the stimulable phosphors emit light in proportion to the amount of energy stored on the stimulable phosphors during the exposure of the stimulable phosphors to the electron beam. Specifically, the electron beam is irradiated to a metal sample or a nonmetal sample, and an electron beam diffraction image or an electron beam transmission image of the sample is detected. The thus detected image is utilized for an element analysis, a sample composition analysis, a sample structure analysis, and the like. Alternatively, the electron beam is irradiated to an organism tissue, and an image of the organism tissue is detected.

Also, it has been proposed to use stimulable phosphors as radiation detecting materials in radiation diffraction image detecting systems, the stimulable phosphors having the characteristics such that the stimulable phosphors absorb and store energy from radiation during exposure to the radiation and, when the stimulable phosphors are then stimulated by an electromagnetic wave having wavelengths falling within a specific wavelength range, the stimulable phosphors emit light in proportion to the amount of energy stored on the stimulable phosphors during the exposure of the stimulable phosphors to the radiation. Specifically, with the radiation diffraction image detecting systems, the radiation is irradiated to a sample, and a radiation diffraction image of the sample is detected. The thus detected image is utilized for a sample structure analysis, and the like.

The electron microscope image detecting systems and the radiation diffraction image detecting systems described above are disclosed in, for example, Japanese Unexamined Patent Publication Nos. 59 (1984)-15843 and 61(1986)-93538, and U.S. Pat. No. 4,889,990.

The aforesaid various systems utilizing the stimulable phosphor sheets as the image detecting materials have the advantages in that chemical processing, such as development processing, need not be performed as in cases where photographic film is used. Also, the aforesaid various systems utilizing the stimulable phosphor sheets as the image detecting materials have the advantages in that various kinds of image processing are capable of being performed on the obtained image signals, and desired visible images are capable of being reproduced from the processed image signals. Further, the aforesaid various systems utilizing the stimulable phosphor sheets as the image detecting materials have the advantages in that quantitative analyses are capable of being performed by use of computers.

Further, fluorescence image detecting systems utilizing fluorescent substances as labeling substances in lieu of radioactive labeling substances in the autoradiography image detecting systems have heretofore been known. With the fluorescence image detecting systems, analyses of gene sequences and gene expression levels, separation and identification of proteins, and evaluation of molecular weights and characteristics of proteins are capable of being performed in accordance with information obtained by reading out fluorescence images. Specifically, for example, after a fluoro chrome has been added to a liquid containing a plurality of DNA fragments to be subjected to electrophoresis, electrophoresis of the plurality of the DNA fragments may be performed on a gel support. Alternatively, electrophoresis of a plurality of DNA fragments may be performed on a gel support containing a fluoro chrome. As another alternative, after electrophoresis of a plurality of DNA fragments has been performed on a gel support, the DNA fragments having been subjected to the electrophoresis maybe leveled with a fluoro chrome by, for example, a process for dipping the gel support in a liquid containing the fluoro chrome, the fluoro chrome may then be excited with excitation light to produce fluorescence, the thus produced fluorescence may be detected, and a fluorescence image may thereby be formed. In accordance with the thus formed fluorescence image, a DNA distribution on the gel support is capable of being detected.

As a further alternative, with the fluorescence image detecting systems, after electrophoresis of a plurality of DNA fragments has been performed on a gel support, the DNA fragments having been subjected to the electrophoresis may be denatured. Thereafter, at least part of the denatured DNA fragments may be transcribed to a transcription support, such as nitrocellulose, with a Southern blotting technique. The denatured DNA fragments and a probe having been prepared by labeling a DNA or an RNA, which is complementary to a target DNA, with a fluoro chrome, may then be subjected to hybridization. In this manner, only a DNA fragment, which is complementary to the probe DNA or the probe RNA, is selectively labeled with the fluoro chrome. Thereafter, the fluoro chrome, with which the DNA fragment described above has been labeled, may be excited with the excitation light to produce the fluorescence, the thus produced fluorescence maybe detected, and a fluorescence image may thereby be formed. In accordance with the thus formed fluorescence image, a target DNA distribution on the transcription support is capable of being detected.

As a still further alternative, with the fluorescence image detecting systems, a DNA probe, which is complementary to a DNA containing a target gene and has been labeled with a labeling substance, may be prepared. The DNA probe and a DNA on a transcription support may then be subjected to hybridization. Also, an enzyme maybe subjected to binding with the complementary DNA having been labeled with the labeling substance, and the thus bound enzyme may then be brought into contact with a fluorescence substrate in order to convert the fluorescence substrate into a fluorescent substance, which is capable of producing the fluorescence. Thereafter, the fluorescent substance may be excited with the excitation light to produce the fluorescence, the thus produced fluorescence maybe detected, and a fluorescence image may thereby be formed. In accordance with the thus formed fluorescence image, a target DNA distribution on the transcription support is capable of being detected.

The fluorescence image detecting systems have the advantages in that a radioactive substance need not be used, and the gene sequences, and the like, are capable of being detected in a simple manner.

The autoradiography image detecting systems, the chemiluminescence image detecting systems, the electron microscope image detecting systems, the radiation diffraction image detecting systems, and the fluorescence image detecting systems described above are utilized for the same purposes of use. Therefore, there has been proposed an image read-out apparatus capable of being utilized commonly for the autoradiography image detecting systems, the chemiluminescence image detecting systems, the electron microscope image detecting systems, the radiation diffraction image detecting systems, and the fluorescence image detecting systems described above.

The image read-out apparatus proposed for use in the systems described above comprises an optical head for irradiating the stimulating rays (or the excitation light) to the image carrier, such as the stimulable phosphor sheet provided with the stimulable phosphor layer, the transcription support containing the sample labeled with the fluorescent substance, or the gel support containing the sample labeled with the fluorescent substance, and collecting the light emitted by the image carrier, such as the light, which is emitted by the stimulable phosphor contained in the stimulable phosphor layer when the stimulable phosphor is stimulated by the stimulating rays, or the fluorescence, which is produced by the fluorescent substance for the labeling of the sample when the fluorescent substance is excited by the excitation light. In order to scan the image carrier, the optical head is capable of being moved in two dimensional directions along a plane parallel with the image carrier.

Both the stimulating rays for stimulating the stimulable phosphor and the excitation light for exciting the fluorescent substance will hereinbelow be referred to as the stimulating rays.

Specifically, there has been proposed an image read-out apparatus, wherein an optical head is moved for reciprocal scanning with respect to an image carrier, which carries image information thereon, and in a main scanning direction and moved in a sub-scanning direction, which intersects with the main scanning direction, stimulating rays are irradiated through the optical head onto the image carrier, light, which is emitted by the image carrier when the image carrier is exposed to the stimulating rays, is collected by the optical head and received by photoelectric conversion means, such as a photomultiplier (hereinbelow referred to as the PMT) or a CCD image sensor, and an image signal, which represents the image information recorded on the image carrier, is acquired from photoelectric conversion of the emitted light performed by the photoelectric conversion means.

As a read-out technique with the image read-out apparatus described above, there has heretofore been known a read-out technique, wherein image signal components are acquired from the image carrier in each of a forward scanning stage and a backward scanning stage of the reciprocal scanning with the optical head. With the read-out technique, an image information acquisition start position, from which the acquisition of the image information is started, and an image information acquisition length, over which the acquisition of the image information is performed, are determined previously. Also, the position of an image acquiring region in the forward scanning stage, which region extends on the image carrier in the main scanning direction, and the position of an image acquiring region in the backward scanning stage, which region extends on the image carrier in the main scanning direction, are matched with each other with respect to the main scanning direction. In this manner, forward scanning image signal components are acquired in the forward scanning stage, and backward scanning image signal components are acquired in the backward scanning stage.

Specifically, with the read-out technique described above, a position, which is spaced away by the image information acquisition length in the main scanning direction from the image information acquisition start position, is taken as an image information acquisition end position. Also, the image information acquisition start position in the forward scanning stage and the image information acquisition end position in the backward scanning stage are set so as to coincide with each other with respect to the main scanning direction, such that the position of the image acquiring region in the forward scanning stage and the position of the image acquiring region in the backward scanning stage coincide with each other with respect to the main scanning direction.

However, in cases where the image information acquisition start position in the forward scanning stage or the backward scanning stage shifts in the main scanning direction from the predetermined position, which has been set previously, due to a change in temperature, a change with the passage of time, or the like, the problems described below occur. Specifically, the image information acquisition start position in the forward scanning stage and the image information acquisition end position in the backward scanning stage do not coincide with each other with respect to the main scanning direction. Also, the image information acquisition start position in the backward scanning stage and the image information acquisition end position in the forward scanning stage do not coincide with each other with respect to the main scanning direction. Therefore, in such cases, the forward scanning image signal components and the backward scanning image signal components are acquired respectively from the image acquiring region on the image carrier in the forward scanning stage and the image acquiring region on the image carrier in the backward scanning stage, which regions do not coincide with each other with respect to the main scanning direction. The forward scanning image signal components and the backward scanning image signal components having thus been acquired are utilized for reproduction and displaying of the image information, which are performed in accordance with predetermined setting such that the image information acquisition start position in the forward scanning stage and the image information acquisition end position in the backward scanning stage coincide with each other with respect to the main scanning direction. Accordingly, in the displayed image, a forward scanning image display region, which is represented by the forward scanning image signal components, and a backward scanning image display region, which is represented by the backward scanning image signal components, shift from each other in the main scanning direction. In such cases, values of pixels in the displayed image, which pixels are represented by the forward scanning image signal components and the backward scanning image signal components and are arrayed in the sub-scanning direction, take discontinuous values. Specifically, the difference between the values of the pixels become large. As a result, a contour, or the like, of the displayed image, which is formed with the forward scanning image display region represented by the forward scanning image signal components and the backward scanning image display region represented by the backward scanning image signal components, is blurred.

Also, in cases where the image information has been recorded with high contrast on the image carrier, it often occurs that the intensity of the light emitted by the image carrier changes markedly from a high intensity to a low intensity. In such cases, the photoelectric conversion means, which is receiving the emitted light of the high intensity and is performing the photoelectric conversion by producing many electrons or electric charges, cannot be reset quickly in accordance with the marked change in emitted light intensity. Therefore, a phenomenon often occurs such that the image signal components, which represent the intensities higher than the intensity of the received light, are acquired until the photoelectric conversion means is reset to a state in which the photoelectric conversion means is capable of accurately acquiring image signal components. The phenomenon described above is referred to as the trailing. In cases where the optical head, which has scanned a certain region emitting the light of the high intensity, successively moves beyond the certain region and scans a next region emitting the light of the low intensity, the training occurs in the image signal components, which are acquired when the optical head scans the next region described above. Therefore, the direction, in which the trailing occurs, varies for the forward scanning image signal components and the backward scanning image signal components. Accordingly, as in the cases described above, the problems occur in that the contour, or the like, of the displayed image, which is reproduced from the forward scanning image signal components and the backward scanning image signal components and represent the image information recorded on the image carrier, is blurred.

The problems described above occur commonly in cases where the read-out technique described above is applied to the autoradiography image detecting systems, the chemiluminescence image detecting systems, the electron microscope image detecting systems, the radiation diffraction image detecting systems, the fluorescence image detecting systems, and the like.

SUMMARY OF THE INVENTION

The primary object of the present invention is to provide a method of processing a read-out image, wherein image quality of an image is capable of being prevented from becoming bad due to a difference between an image signal component acquiring condition in a forward scanning stage and an image signal component acquiring condition in a backward scanning stage.

Another object of the present invention is to provide an apparatus for carrying out the method of processing a read-out image.

The present invention provides a method of processing a read-out image, comprising the steps of:

i) moving scanning means for reciprocal scanning with respect to an image carrier, which carries image information thereon, and in a main scanning direction, ii) moving the scanning means with respect to the image carrier and in a sub-scanning direction, which intersects with the main scanning direction, and iii) performing photoelectric conversion of light, which comes from the image carrier, an electric image signal, which represents the image information carried on the image carrier, being acquired from the photoelectric conversion, wherein smoothing operation processing is performed on forward scanning image signal components and backward scanning image signal components, which have been acquired respectively in a forward scanning stage and a backward scanning stage consecutive in the reciprocal scanning, and with respect to the sub-scanning direction, a processed image signal, which represents the image information, being formed with the smoothing operation processing.

The method of processing a read-out image in accordance with the present invention may be modified such that the smoothing operation processing is arithmetic mean calculation processing performed on the forward scanning image signal components and the backward scanning image signal components and with respect to the sub-scanning direction, and the processed image signal, which represents the image information, is formed with the arithmetic mean calculation processing.

Alternatively, the method of processing a read-out image in accordance with the present invention may be modified such that the smoothing operation processing is operation processing for:

comparing values of a forward scanning image signal component and a backward scanning image signal component, which image signal components represent pixels in the image information that are adjacent to each other in the sub-scanning direction, with each other, and employing the value of the forward scanning image signal component or the backward scanning image signal component, whichever has a smaller value, as the value of an image signal component of the processed image signal.

As another alternative, the method of processing a read-out image in accordance with the present invention may be modified such that the smoothing operation processing is operation processing for:

comparing values of a forward scanning image signal component and a backward scanning image signal component, which image signal components represent pixels in the image information that are adjacent to each other in the sub-scanning direction, with each other, employing the value of the forward scanning image signal component or the backward scanning image signal component, whichever has a smaller value, as the value of one of line image signal components, which correspond to a line extending in the main scanning direction, a plurality of sets of the line image signal components, which sets correspond to a plurality of lines extending in the main scanning direction and standing side by side with respect to the sub-scanning direction, being thereby formed, employing the line image signal components, which correspond to an odd-numbered line, as counted in the sub-scanning direction, as image signal components of the processed image signal, which image signal components correspond to an odd-numbered line in an array of pixels in a processed image represented by the processed image signal, performing arithmetic mean calculation processing on two sets of the line image signal components, which sets correspond to two odd-numbered lines lying on both sides of an even-numbered line, and with respect to the sub-scanning direction, and employing the image signal components, which have thus been obtained from the arithmetic mean calculation processing, as image signal components of the processed image signal, which image signal components correspond to an even-numbered line in the array of the pixels in the processed image represented by the processed image signal.

The present invention also provides an apparatus for processing a read-out image, comprising:

i) photoelectric conversion means for performing photoelectric conversion of light coming from an image carrier, which carries image information thereon, in order to acquire an electric image signal, which represents the image information carried on the image carrier, ii) reciprocal main scanning means for moving scanning means for reciprocal scanning with respect to the image carrier and in a main scanning direction, iii) sub-scanning means for moving the scanning means with respect to the image carrier and in a sub-scanning direction, which intersects with the main scanning direction, and iv) image information acquiring means for:

actuating the reciprocal main scanning means to move the scanning means for the reciprocal scanning with respect to the image carrier and in the main scanning direction, actuating the sub-scanning means to move the scanning means with respect to the image carrier and in the sub-scanning direction, and actuating the photoelectric conversion means to perform the photoelectric conversion of the light, which comes from the image carrier, in order to acquire the electric image signal, which represents the image information carried on the image carrier, wherein the apparatus further comprises operation processing means for performing smoothing operation processing on forward scanning image signal components and backward scanning image signal components, which have been acquired respectively in a forward scanning stage and a backward scanning stage consecutive in the reciprocal scanning, and with respect to the sub-scanning direction in order to form a processed image signal, which represents the image information.

The apparatus for processing a read-out image in accordance with the present invention may be constituted such that:

an optical head for receiving the light, which comes from the image carrier, and guiding the light toward the d photoelectric conversion means is employed as the scanning means, the reciprocal main scanning means moves the optical head for the reciprocal scanning with respect to the image carrier and in the main scanning direction, the sub-scanning means moves the optical head with respect to the image carrier and in the sub-scanning direction, which intersects with the main scanning direction, and the image information acquiring means performs operations for:

actuating the reciprocal main scanning means to move the optical head for the reciprocal scanning with respect to the image carrier and in the main scanning direction, actuating the sub-scanning means to move the optical head with respect to the image carrier and in the sub-scanning direction, and actuating the photoelectric conversion means to perform the photoelectric conversion of the light, which comes from the image carrier, in order to acquire the electric image signal, which represents the image information carried on the image carrier.

Alternatively, the apparatus for processing a read-out image in accordance with the present invention may be constituted such that:

a light beam is employed as the scanning means, the photoelectric conversion means performs the photoelectric conversion of the light coming from the image carrier, which carries the image information thereon, in order to acquire the electric image signal, which represents the image information carried on the image carrier, the reciprocal main scanning means is constituted of a galvanometer mirror, or the like, for moving the light beam for the reciprocal scanning with respect to the image carrier and in the main scanning direction, the sub-scanning means moves the light beam with respect to the image carrier and in the sub-scanning direction, which intersects with the main scanning direction, and the image information acquiring means performs operations for:

actuating the reciprocal main scanning means to move the light beam for the reciprocal scanning with respect to the image carrier and in the main scanning direction, actuating the sub-scanning means to move the light beam with respect to the image carrier and in the sub-scanning direction, and actuating the photoelectric conversion means to perform the photoelectric conversion of the light, which comes from the image carrier, in order to acquire the electric image signal, which represents the image information carried on the image carrier.

The apparatus for processing a read-out image in accordance with the present invention may be modified such that the smoothing operation processing, which is performed by the operation processing means, is arithmetic mean calculation processing performed on the forward scanning image signal components and the backward scanning image signal components and with respect to the sub-scanning direction, and the processed image signal, which represents the image information, is formed with the arithmetic mean calculation processing.

Alternatively, the apparatus for processing a read-out image in accordance with the present invention may be modified such that the smoothing operation processing, which is performed by the operation processing means, is operation processing for:

comparing values of a forward scanning image signal component and a backward scanning image signal component, which image signal components represent pixels in the image information that are adjacent to each other in the sub-scanning direction, with each other, and employing the value of the forward scanning image signal component or the backward scanning image signal component, whichever has a smaller value, as the value of an image signal component of the processed image signal.

As another alternative, the apparatus for processing a read-out image in accordance with the present invention may be modified such that the smoothing operation processing, which is performed by the operation processing means, is operation processing for:

comparing values of a forward scanning image signal component and a backward scanning image signal component, which image signal components represent pixels in the image information that are adjacent to each other in the sub-scanning direction, with each other, employing the value of the forward scanning image signal component or the backward scanning image signal component, whichever has a smaller value, as the value of one of line image signal components, which correspond to a line extending in the main scanning direction, a plurality of sets of the line image signal components, which sets correspond to a plurality of lines extending in the main scanning direction and standing side by side with respect to the sub-scanning direction, being thereby formed, employing the line image signal components, which correspond to an odd-numbered line, as counted in the sub-scanning direction, as image signal components of the processed image signal, which image signal components correspond to an odd-numbered line in an array of pixels in a processed image represented by the processed image signal, performing arithmetic mean calculation processing on two sets of the line image signal components, which sets correspond to two odd-numbered lines lying on both sides of an even-numbered line, and with respect to the sub-scanning direction, and employing the image signal components, which have thus been obtained from the arithmetic mean calculation processing, as image signal components of the processed image signal, which image signal components correspond to an even-numbered line in the array of the pixels in the processed image represented by the processed image signal.

The term "smoothing operation processing on forward scanning image signal components and backward scanning image signal components and with respect to a sub-scanning direction" as used herein means the operation processing for suppressing the difference between the values of the forward scanning image signal component and the backward scanning image signal component, which image signal components represent pixels in the image information that stand side by side in the sub-scanning direction.

The term "light coming from an image carrier" as used herein means the light emitted by the image carrier, the light reflected from the image carrier, the light having passed through the image carrier, or the like.

As will be understood from the specification, it should be noted that the term "moving scanning means with respect to an image carrier" as used herein means movement of the scanning means relative to the image carrier and embraces the cases wherein the scanning means is moved while the image carrier is kept stationary, the cases wherein the image carrier is moved while d the scanning means is kept stationary, and the cases wherein both the scanning means and the image carrier are moved with respect to each other.

The present invention further provides an apparatus for processing a read-out image, comprising:

i) an optical head for receiving light coming from an image carrier, which carries image information thereon, ii) photoelectric conversion means for performing photoelectric conversion of the light, which has traveled through the optical head, in order to acquire an electric image signal, which represents the image information carried on the image carrier, iii) reciprocal main scanning means for moving the optical head for reciprocal scanning with respect to the image carrier and in a main scanning direction, iv) sub-scanning means for moving the optical head with respect to the image carrier and in a sub-scanning direction, which intersects with the main scanning direction, and v) image information acquiring means for:

actuating the reciprocal main scanning means to move the optical head for the reciprocal scanning with respect to the image carrier and in the main scanning direction, actuating the sub-scanning means to move the optical head with respect to the image carrier and in the sub-scanning direction, and actuating the photoelectric conversion means to perform the photoelectric conversion of the light coming from the image carrier, which light has traveled through the optical head, in order to acquire the electric image signal, which represents the image information carried on the image carrier, wherein the apparatus further comprises operation processing means for performing smoothing operation processing on forward scanning image signal components and backward scanning image signal components, which have been acquired respectively in a forward scanning stage and a backward scanning stage consecutive in the reciprocal scanning, and with respect to the sub-scanning direction in order to form a processed image signal, which represents the image information.

With the method and apparatus for processing a read-out image in accordance with the present invention, the smoothing operation processing is performed on the forward scanning image signal components and the backward scanning image signal components, which have been acquired respectively in the forward scanning stage and the backward scanning stage consecutive in the reciprocal scanning, and with respect to the sub-scanning direction. The processed image signal, which represents the image information, is formed with the smoothing operation processing. Therefore, the difference in condition of image signal acquisition between the forward scanning stage and the backward scanning stage is capable of being smoothed. Specifically, the difference in image density between pixels in a forward scanning image display region, which is represented by the forward scanning image signal components having been acquired in the forward scanning stage, and the pixels in a backward scanning image display region, which is represented by the backward scanning image signal components having been acquired in the backward scanning stage that continues from the forward scanning stage, the difference being taken with respect to the sub-scanning direction, is capable of being suppressed. Accordingly, the forward scanning image display region and the backward scanning image display region are capable of being connected smoothly in the sub-scanning direction, and the image quality of the obtained image is capable of being prevented from becoming bad due to the difference in condition of image signal acquisition between the forward scanning stage and the backward scanning stage.

The method and apparatus for processing a read-out image in accordance with the present invention may be modified such that the smoothing operation processing is the arithmetic mean calculation processing performed on the forward scanning image signal components and the backward scanning image signal components and with respect to the sub-scanning direction, and the processed image signal, which represents the image information, is formed with the arithmetic mean calculation processing. Also, the method and apparatus for processing a read-out image in accordance with the present invention may be modified such that the smoothing operation processing is the operation processing for: comparing the values of the forward scanning image signal component and the backward scanning image signal component, which image signal components represent the pixels in the image information that are adjacent to each other in the sub-scanning direction, with each other, and employing the value of the forward scanning image signal component or the backward scanning image signal component, whichever has a smaller value, as the value of the image signal component of the processed image signal.

With the modifications described above, the difference in image density between the pixels in the forward scanning image display region, which is represented by the forward scanning image signal components having been acquired in the forward scanning stage, and the pixels in the backward scanning image display region, which is represented by the backward scanning image signal components having been acquired in the backward scanning stage that continues from the forward scanning stage, the difference being taken with respect to the sub-scanning direction, is capable of being suppressed reliably.

Further, the method and apparatus for processing a read-out image in accordance with the present invention may be modified such that the smoothing operation processing is the operation processing for: comparing the values of the forward scanning image signal component and the backward scanning image signal component, which image signal components represent the pixels in the image information that are adjacent to each other in the sub-scanning direction, with each other, employing the value of the forward scanning image signal component or the backward scanning image signal component, whichever has a smaller value, as the value of one of the line image signal components, which correspond to the line extending in the main scanning direction, the plurality of the sets of the line image signal components, which sets correspond to the plurality of the lines extending in the main scanning direction and standing side by side with respect to the sub-scanning direction, being thereby formed, employing the line image signal components, which correspond to the odd-numbered line, as counted in the sub-scanning direction, as the image signal components of the processed image signal, which image signal components correspond to the odd-numbered line in the array of the pixels in the processed image represented by the processed image signal, performing the arithmetic mean calculation processing on two sets of the line image signal components, which sets correspond to two odd-numbered lines lying on both sides of the even-numbered line, and with respect to the sub-scanning direction, and employing the image signal components, which have thus been obtained from the arithmetic mean calculation processing, as the image signal components of the processed image signal, which image signal components correspond to the even-numbered line in the array of the pixels in the processed image represented by the processed image signal.

With the modifications described above, the difference in image density between the pixels in the forward scanning image display region and the pixels in the backwards canning image display region, the difference being taken with respect to the sub-scanning direction, is capable of being suppressed even further.

BRIEF DESCRIPTION OF THE DRAWINGS

FIG. 9 is an explanatory view showing values of pixels represented by forward scanning image signal components and backward scanning image signal components representing an area in the vicinity of the contour line, which image signal components have been acquired respectively from forward scanning image acquiring regions and backward scanning image acquiring regions on the image carrier, FIG. 10A is an explanatory view showing the values of the pixels represented by the forward scanning image signal components and the backward scanning image signal components of FIG. 9 representing the area in the vicinity of the contour line, the pixels having been arrayed such that predetermined pixels corresponding to each other with respect to a sub-scanning direction stand side by side with respect to the sub-scanning direction, FIG. 10B is an explanatory view showing image information reproduced from the forward scanning image signal components and the backward scanning image signal components, which image signal components represent the pixels having been arrayed as shown in FIG. 10A, in cases where smoothing operation processing is not performed.

DESCRIPTION OF THE PREFERRED EMBODIMENTS

The present invention will hereinbelow be described in further detail with reference to the accompanying drawings.

Figure 1:
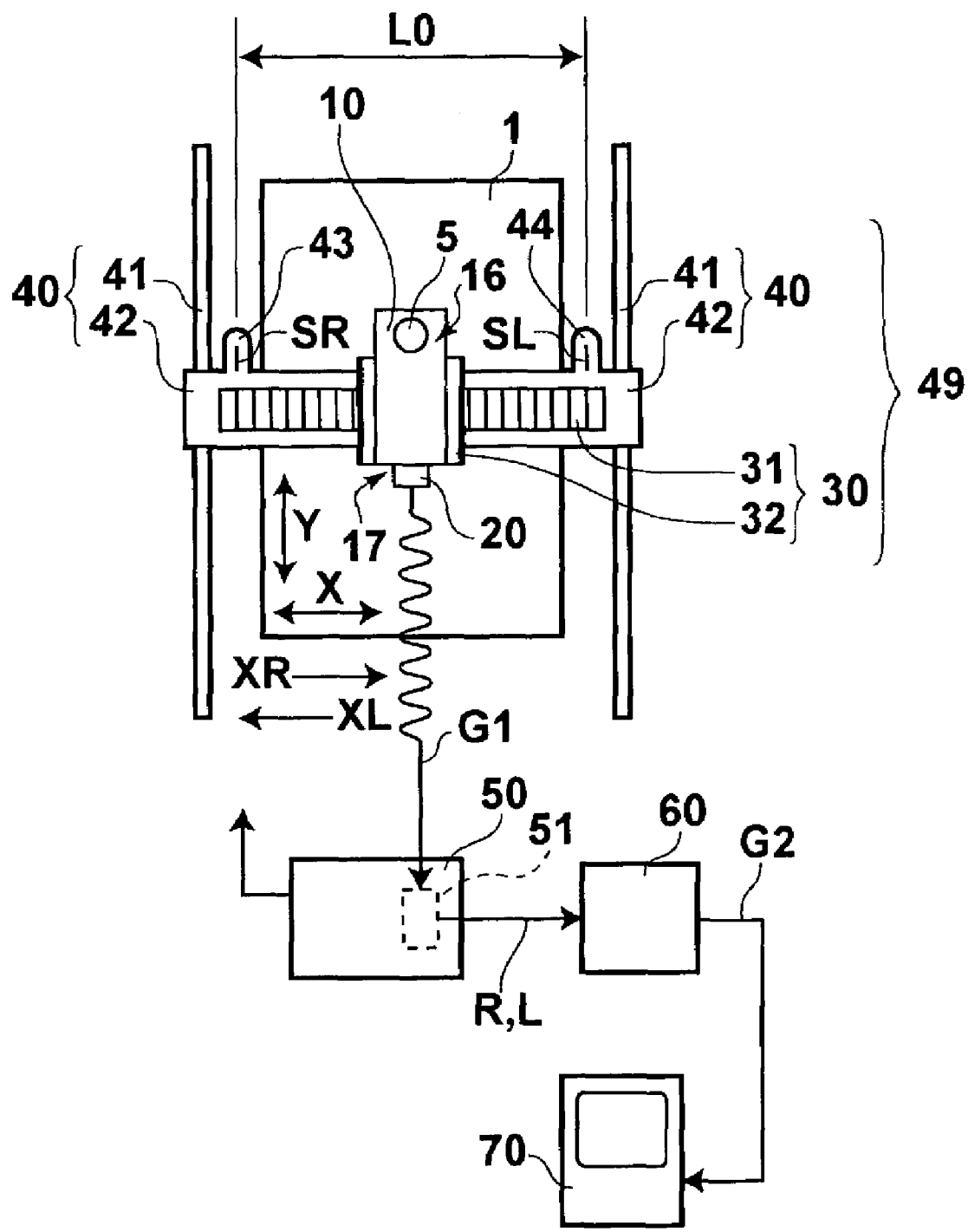
FIG. 1 is a block diagram showing an embodiment of the apparatus for processing a read-out image in accordance with the present invention.
Figure 2:
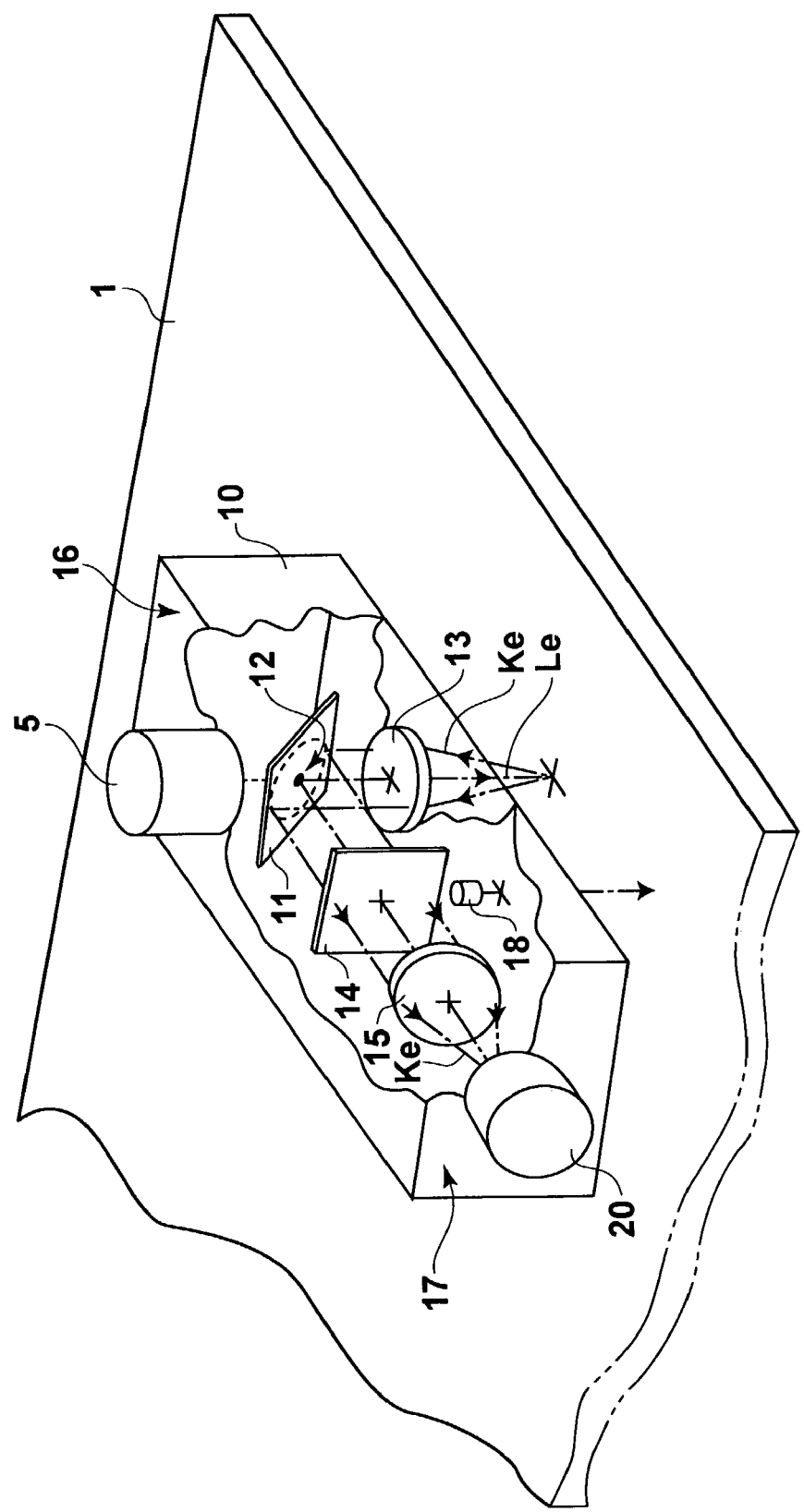
FIG. 2 is an enlarged perspective view showing an optical head.
Figure 3:
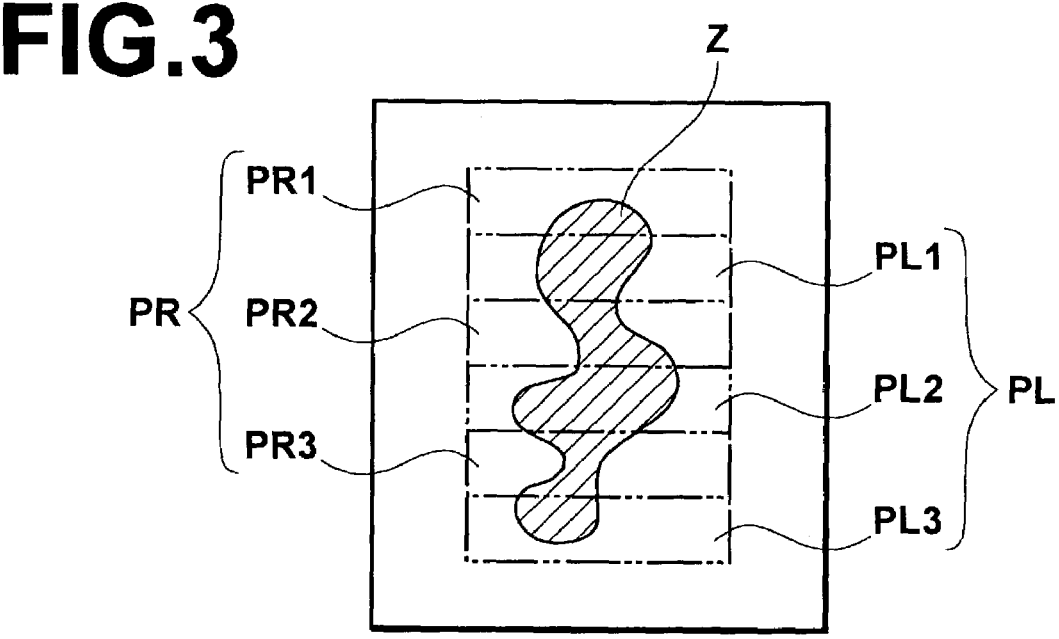
FIG. 3 is an explanatory view showing image information having been recorded on an image carrier.
Figure 4:
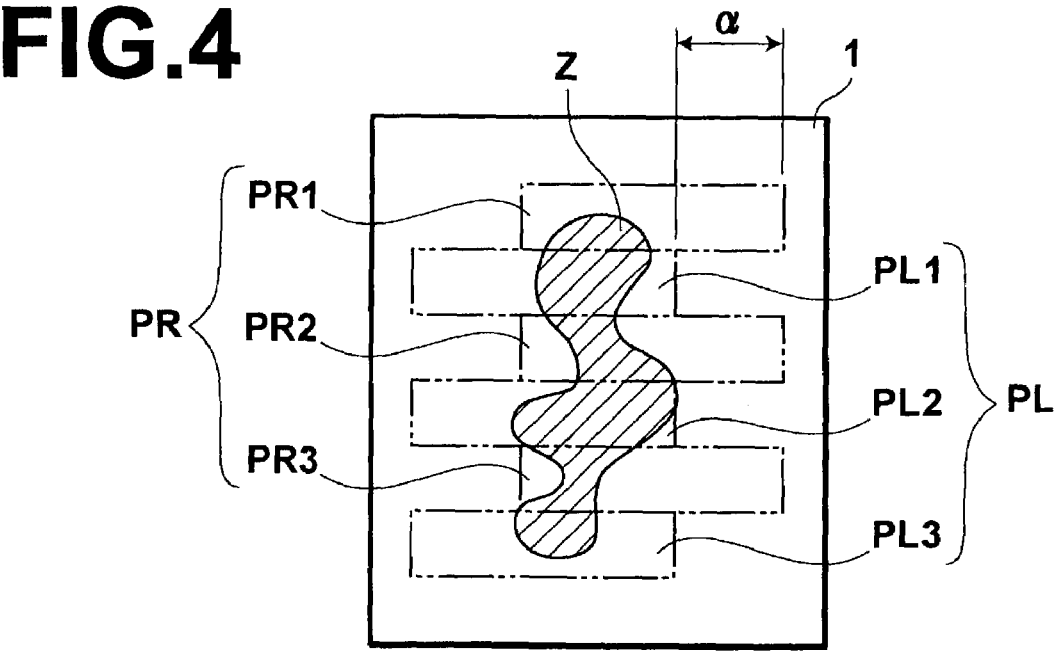
FIG. 4 is an explanatory view showing how a position of a forward scanning image acquiring region and a position of a backward scanning image acquiring region do not coincide with each other with respect to a main scanning direction.
Figure 5:
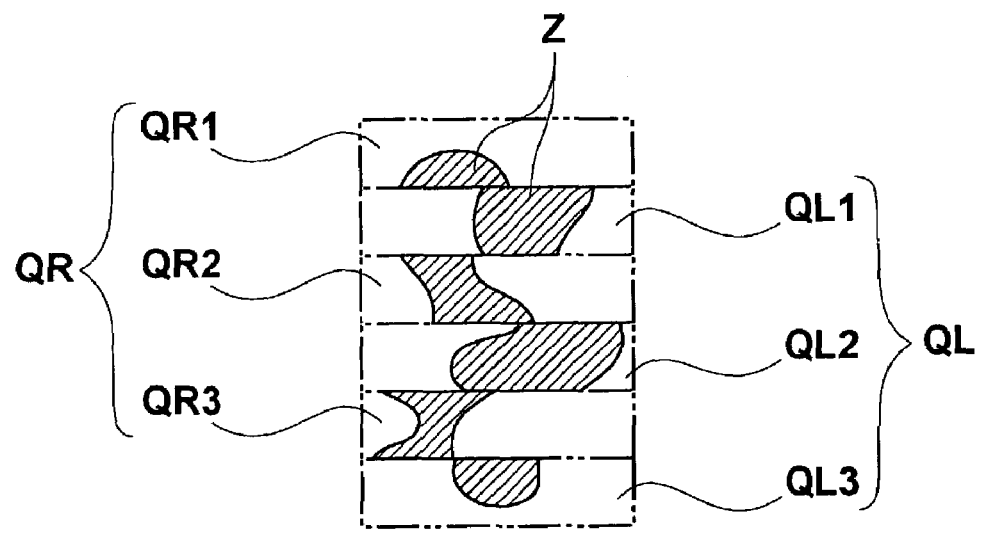
FIG. 5 is an explanatory view showing image information reproduced from an image signal having been acquired in a state, in which a forward scanning image acquiring region and a backward scanning image acquiring region are shifted in a main scanning direction.
Figure 6:
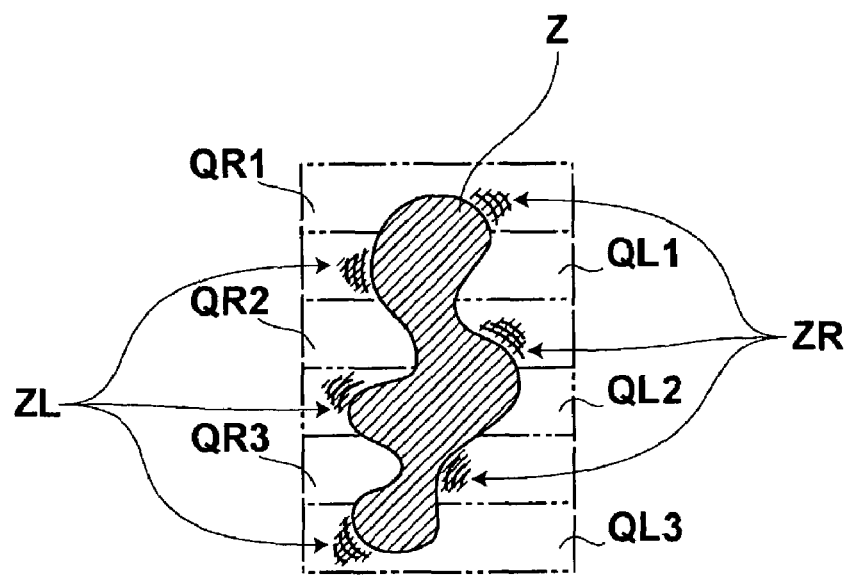
FIG. 6 is an explanatory view showing image information reproduced from forward scanning image signal components and backward scanning image signal components, which have been acquired such that trailing occurs.
Figure 7:
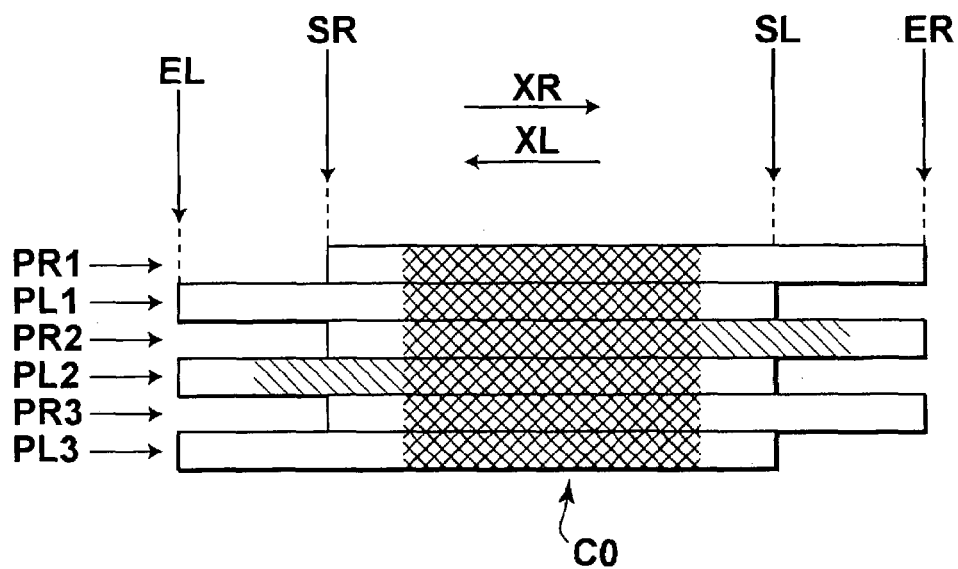
FIG. 7 is an enlarged explanatory view showing how a contour line in image information is acquired in a state, in which a forward scanning image acquiring region and a backward scanning image acquiring region are shifted in a main scanning direction.
Figure 8:
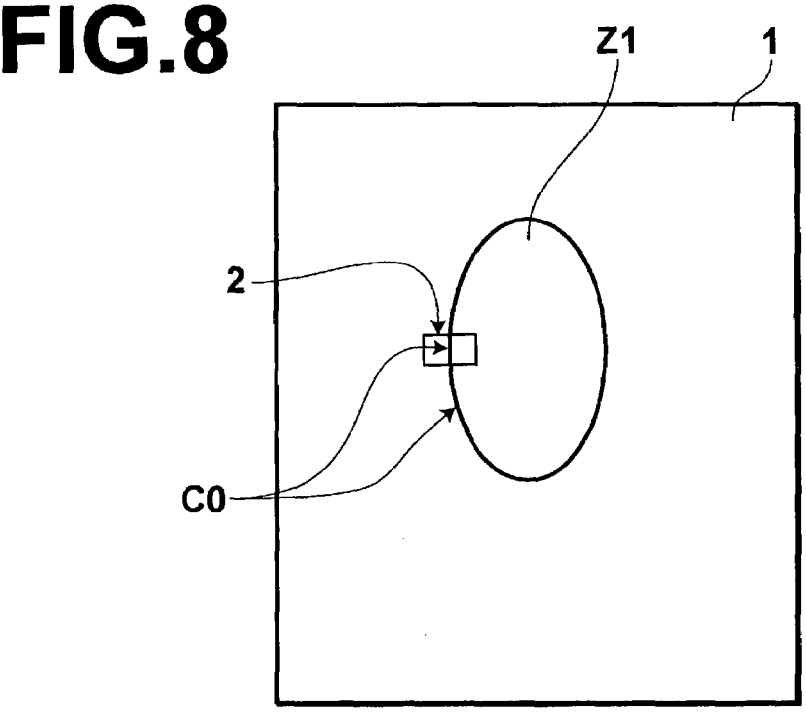
FIG. 8 is an explanatory view showing a region on an image carrier, in which region a contour line in image information has been recorded.

FIG. 1 is a block diagram showing an embodiment of the apparatus for processing a read-out image in accordance with the present invention. FIG. 2 is an enlarged perspective view showing an optical head. FIG. 3 is an explanatory view showing image information having been recorded on an image carrier. FIG. 4 is an explanatory view showing how a position of a forward scanning image acquiring region and a position of a backward scanning image acquiring region do not coincide with each other with respect to a main scanning direction. FIG. 5 is an explanatory view showing image information reproduced from an image signal having been acquired in a state, in which a forward scanning image acquiring region and a backward scanning image acquiring region are shifted in a main scanning direction. FIG. 6 is an explanatory view showing image information reproduced from forward scanning image signal components and backward scanning image signal components, which have been acquired such that trailing occurs. FIG. 7 is an enlarged explanatory view showing how a contour line in image information is acquired in a state, in which a forward scanning image acquiring region and a backward scanning image acquiring region are shifted in a main scanning direction. FIG. 8 is an explanatory view showing a region on an image carrier, in which region a contour line in image information has been recorded. FIG. 9 is an explanatory view showing values of pixels represented by forward scanning image signal components and backward scanning image signal components representing an area in the vicinity of the contour line, which image signal components have been acquired respectively from forward scanning image acquiring regions and backward scanning image acquiring regions on the image carrier.

As illustrated in FIG. 1, the embodiment of the read-out image processing apparatus in accordance with the present invention comprises an optical head 10 acting as scanning means. The optical head 10 receives light, which comes from an image carrier 1 carrying image information thereon. The read-out image processing apparatus also comprises photoelectric conversion means 20 for performing photoelectric conversion of the light, which has traveled through the optical head 10, in order to acquire an electric image signal representing the image information carried on the image carrier 1. The photoelectric conversion means 20 may be constituted of a CCD image sensor, a PMT, or the like. The read-out image processing apparatus further comprises reciprocal main scanning means 30 for moving the optical head 10 for reciprocal scanning with respect to the image carrier 1 and in a main scanning direction, which is indicted by the double headed arrow X in FIG. 1. The read-out image processing apparatus still further comprises sub-scanning means 40 for moving the optical head 10 with respect to the image carrier 1 and in a sub-scanning direction, which is indicated by the double headed arrow Y in FIG. 1 and intersects with the main scanning direction. The read-out image processing apparatus also comprises image information acquiring means 50. The image information acquiring means 50 actuates the reciprocal main scanning means 30 to move the optical head 10 for the reciprocal scanning with respect to the image carrier 1 and in the main scanning direction. The image information acquiring means 50 also actuates the sub-scanning means 40 to move the optical head 10 with respect to the image carrier 1 and in the sub-scanning direction. The image information acquiring means 50 further actuates the photoelectric conversion means 20 to perform the photoelectric conversion of the light coming from the image carrier 1, which light has traveled through the optical head 10, in order to acquire an image signal G1, which represents the image information carried on the image carrier 1. The read-out image processing apparatus further comprises operation processing means 60 for performing smoothing operation processing on forward scanning image signal components R and backward scanning image signal components L, which have been acquired respectively in a forward scanning stage and a backward scanning stage consecutive in the reciprocal scanning, and with respect to the sub-scanning direction in order to form a processed image signal G2, which represents the image information. The read-out image processing apparatus still further comprises a display device 70 for reproducing a visible image from the processed image signal G2, which has been acquired from the operation processing means 60. The display device 70 displays the thus reproduced visible image.

As the smoothing operation processing, the operation processing means 60 may perform arithmetic mean calculation processing on the forward scanning image signal components R and the backward scanning image signal components L and with respect to the sub-scanning direction in order to form the processed image signal G2. Alternatively, as the smoothing operation processing, the operation processing means 60 may perform operation processing for: comparing the values of the forward scanning image signal component R and the backward scanning image signal component L, which image signal components represent the pixels in the image information that are adjacent to each other in the sub-scanning direction, with each other, and employing the value of the forward scanning image signal component R or the backward scanning image signal component L, whichever has a smaller value, as the value of the image signal component of the processed image signal.

As illustrated in FIG. 2, a stimulating ray source 5 for producing stimulating rays Le is located on a top surface 16 of the optical head 10. Also, the photoelectric conversion means 20 is located on a side surface 17 of the optical head 10. The optical head 10 comprises a perforated mirror 11 having a through-hole 12 at its center point. The through-hole 12 allows the stimulating rays Le, which have been produced by the stimulating ray source 5 and take on the form of a collimated light beam having a small beam diameter, to pass therethrough. The optical head 10 also comprises a convex lens 13 for converging the stimulating rays Le, which have passed through the through-hole 12 of the perforated mirror 11, with a center area of the convex lens 13. When the image carrier 1 is exposed to the stimulating rays Le, which have been converged by the convex lens 13, the image carrier 1 produces fluorescence Ke. The optical head 10 further comprises a converging lens 15 for converging the fluorescence Ke, which has been produced by the image carrier 1 and has then traveled via the convex lens 13, the perforated mirror 11, and a stimulating ray cut-off filter 14. The optical head 10 still further comprises a scanning start line detector 18 for detecting a scanning start line SR on a forward scanning start line plate 43, which will be described later. The fluorescence Ke, which has been produced by the image carrier 1 when the image carrier 1 is exposed to the stimulating rays Le, is collimated by the convex lens 13 into a collimated light beam having a large beam diameter and is reflected by regions of the perforated mirror 11 other than the through-hole 12. The collimated light beam of the fluorescence Ke then passes through the stimulating ray cut-off filter 14 and is converged by the converging lens 15 onto the photoelectric conversion means 20. The fluorescence Ke is received by the photoelectric conversion means 20 and converted photoelectrically by the photoelectric conversion means 20. The stimulating rays Le, which are mixed in the fluorescence Ke and travel together with the fluorescence Ke, are blocked by the stimulating ray cut-off filter 14.

The sub-scanning means 40 comprises rails 41, 41, which extend in the sub-scanning direction indicated by the double headed arrow Y. The sub-scanning means 40 also comprises a sub-scanning movement base 42, which is capable of moving on the rails 41, 41 in the sub-scanning direction indicated by the double headed arrow Y.

The reciprocal main scanning means 30 comprises a rail 31, which extends in the main scanning direction indicated by the double headed arrow X and is located on the sub-scanning movement base 42 of the sub-scanning means 40. The reciprocal main scanning means 30 also comprises a main scanning movement base 32, which is capable of reciprocally moving on the rail 31 in the main scanning direction indicated by the double headed arrow X. The optical head 10 is supported on the main scanning movement base 32.

Each of the reciprocal main scanning means 30 and the sub-scanning means 40 may be constituted in one of various ways, in which the means is capable moving the optical head 10 such that the optical head 10 is capable of receiving the light, which comes from the image carrier 1. For example, each of the reciprocal main scanning means 30 and the sub-scanning means 40 may be constituted of known mechanical elements, and the like. Specifically, a ball-and-rail system, or the like, may be employed as a conveyance guide. Also, a rack-and-pinion mechanism, a ball screw-and-ball bushing mechanism, a piston-and-cylinder mechanism, or the like, may be employed as a power transfer mechanism. Further, a motor, a hydraulic actuator, a pneumatic actuator, or the like, may be employed as a driving source.

The reciprocal main scanning means 30 and the sub-scanning means 40 constitute two-dimensional scanning means 49. The optical head 10 is moved by the two-dimensional scanning means 49 for the two-dimensional scanning with respect to the image carrier 1.

How the aforesaid embodiment of the read-out image processing apparatus in accordance with the present invention operates will be described hereinbelow.

In accordance with an instruction given by the image information acquiring means 50, the two-dimensional scanning means 49 is actuated to move the optical head 10 for the reciprocal scanning with respect to the image carrier 1 and in the main scanning direction indicated by the double headed arrow X, and to move the optical head 10 in the sub-scanning direction indicated by the double headed arrow Y. Also, the stimulating rays Le are produced by the stimulating ray source 5 and are irradiated through the optical head 10 onto the image carrier 1. The fluorescence Ke, which has been produced by the image carrier 1 when the image carrier 1 is exposed to the stimulating rays Le, travels through the optical head 10 and is received by the photoelectric conversion means 20. The fluorescence Ke is photoelectrically converted by the photoelectric conversion means 20. The image signal G1, which is made up of the forward scanning image signal components R and the backward scanning image signal components L, is fed from the photoelectric conversion means 20 into the image information acquiring means 50 and stored in image signal storing means 51 of the image information acquiring means 50.

The forward scanning image signal components R are the image signal components acquired in the forward scanning stage, in which the optical head 10 scans the image carrier 1 in a forward scanning direction along the main scanning direction indicated by the double headed arrow X. In FIG. 1, the forward scanning direction along the main scanning direction indicated by the double headed arrow X is indicated by the arrow XR. The scanning start line SR on the forward scanning start line plate 43, which is located on the sub-scanning movement base 42, is detected by the scanning start line detector 18 of the optical head 10. The acquisition of the forward scanning image signal components R by the image information acquiring means 50 is started at the time at which the optical head 10 has moved by a distance of 20 mm in the forward scanning direction indicated by the arrow XR after the scanning start line SR has been detected by the scanning start line detector 18. Also, the acquisition of the forward scanning image signal components R by the image information acquiring means 50 is finished at the time at which the optical head 10 has moved by a distance of 320 mm in the forward scanning direction indicated by the arrow XR after the scanning start line SR has been detected by the scanning start line detector 18.

The backward scanning image signal components L are the image signal components acquired in the backward scanning stage, in which the optical head 10 scans the image carrier 1 in a backward scanning direction along the main scanning direction indicated by the double headed arrow X. In FIG. 1, the backward scanning direction along the main scanning direction indicated by the double headed arrow X is indicated by the arrow XL. A scanning start line SL on a backward scanning start line plate 44, which is located on the sub-scanning movement base 42, is detected by the scanning start line detector 18 of the optical head 10. The acquisition of the backward scanning image signal components L by the image information acquiring means 50 is started at the time at which the optical head 10 has moved by a distance of 20 mm in the backward scanning direction indicated by the arrow XL after the scanning start line SL has been detected by the scanning start line detector 18. Also, the acquisition of the backward scanning image signal components L by the image information acquiring means 50 is finished at the time at which the optical head 10 has moved by a distance of 320 mm in the backward scanning direction indicated by the arrow XL after the scanning start line SL has been detected by the scanning start line detector 18.

In this embodiment, an image information acquisition length Lo between the scanning start line SR on the forward scanning start line plate 43 and the scanning start line SL on the backward scanning start line plate 44 is set at 340 mm (=320 mm+20 mm). Therefore, the position of a pixel in a forward scanning image acquiring region on the image carrier 1, which pixel is represented by the forward scanning image signal component R that is acquired firstly in the forward scanning stage, and the position of a pixel in a backward scanning image acquiring region on the image carrier 1, which pixel is represented by the backward scanning image signal component L that is acquired lastly in the backward scanning stage, coincide with each other with respect to the main scanning direction. Also, the position of a pixel in the forward scanning image acquiring region on the image carrier 1, which pixel is represented by the forward scanning image signal component R that is acquired lastly in the forward scanning stage, and the position of a pixel in the backward scanning image acquiring region on the image carrier 1, which pixel is represented by the backward scanning image signal component L that is acquired firstly in the backward scanning stage, coincide with each other with respect to the main scanning direction. An image information acquisition length, which is the length of the image acquiring region on the image carrier 1 represented by the forward scanning image signal components R or the backward scanning image signal components L, the length being taken in the main scanning direction, is equal to 300 mm.

The forward scanning image signal components R and the backward scanning image signal components L, which have been stored in the image signal storing means 51 of the image information acquiring means 50, are fed into the operation processing means 60. The operation processing means 60 performs the smoothing operation processing on the forward scanning image signal components R and the backward scanning image signal components L and with respect to the sub-scanning direction in order to form the processed image signal G2 representing the image information carried on the image carrier 1.

The processed image signal G2, which has been formed by the operation processing means 60, is fed into the display device 70 and utilized for the reproduction of the image information, which is carried on the image carrier 1, as a visible image. The reproduced visible image is displayed on the display device 70.

How the smoothing operation processing is performed by the operation processing means 60 on the forward scanning image signal components R and the backward scanning image signal components L and with respect to the sub-scanning direction will be described hereinbelow.

As illustrated in FIG. 3, of image information Z recorded on the image carrier 1, the image information in a forward scanning image acquiring region PR1 is acquired as forward scanning image signal components R1. Also, the image information in a backward scanning image acquiring region PL1 is acquired as backward scanning image signal components L1. Under the predetermined setting, the position of the forward scanning image acquiring region PR1 and the position of the backward scanning image acquiring region PL1 will coincide with each other with respect to the main scanning direction.

However, as illustrated in FIG. 4, in cases where the image information acquisition length Lo between the scanning start line SR and the scanning start line SL is set at a length (340 mm-α) shorter than the predetermined length of 340 mm, the position of the forward scanning image acquiring region PR1, which is represented by the forward scanning image signal components RI, and the position of the backward scanning image acquiring region PL1, which is represented by the backward scanning image signal components L1, does not coincide with each other with respect to the main scanning direction. In cases where the forward scanning image signal components R and the backward scanning image signal components L, which have thus been acquired, are directly fed into the display device 70, and a visible image is reproduced by the display device 70 from the forward scanning image signal components R and the backward scanning image signal components L, which have thus been acquired, a reproduced visible image is obtained such that the positions of forward scanning image display regions QR, which are represented by the forward scanning image signal components R, and the positions of backward scanning image display regions QL, which are represented by the backward scanning image signal components L, may coincide with each other with respect to the main scanning direction. As a result, as illustrated in FIG. 5, in the reproduced visible image, the image information Z shifts in the main scanning direction, and the contour of the image information Z becomes uneven.

Also, as illustrated in FIG. 6, in cases where the value of the image information acquisition length Lo is equal to the predetermined value of the image information acquisition length Lo, it often occurs that trailing arises in the forward scanning image signal components R and the backward scanning image signal components L. Specifically, it often occurs that trailing areas ZR and trailing areas ZL arise in different directions in the forward scanning image display regions QR and the backward scanning image display regions QL, respectively. In such cases, as in the cases shown in FIG. 5, the contour of the image information Z becomes uneven with respect to the sub-scanning direction.

As described above, as an example of the cases where the condition of the acquisition of the image signal components varies for the forward scanning stage and the backward scanning stage of the reciprocal scanning, it may occur that the forward scanning image signal components R and the backward scanning image signal components L are acquired in a state in which, as illustrated in FIG. 4, the positions of the forward scanning image acquiring regions PR and the positions of the backward scanning image acquiring regions PL on the image carrier 1 do not coincide with each other. In such cases, in this embodiment, the smoothing operation processing is performed in the manner described below on the forward scanning image signal components R and the backward scanning image signal components L, which have thus been obtained.

FIG. 8 is an explanatory view showing a region 2 of image information Z1 on the image carrier 1, in which region a contour line Co extending in the sub-scanning direction in the image information Z1 has been recorded. FIG. 7 is an enlarged explanatory view showing how the contour line Co extending in the sub-scanning direction in the image information Z1 is acquired as the image signal components in the state, in which the positions of the forward scanning image acquiring regions PR and the positions of the backward scanning image acquiring regions PL on the image carrier 1 do not coincide with each other. Specifically, as illustrated in FIG. 7, as for each of the forward scanning image acquiring regions PR1, PR2, and PR3, the acquisition of the image information in the forward scanning direction indicated by the arrow XR is started at the position of the scanning start line SR and finished at a position ER. Also, as for each of the backward scanning image acquiring regions PL1, PL2, and PL3, the acquisition of the image information in the backward scanning direction indicated by the arrow XL is started at the position of the scanning start line SL and finished at a position EL. Therefore, the image information acquisition start position SR of each of the forward scanning image acquiring regions PR1, PR2, and PR3 and the image information acquisition end position EL of each of the backward scanning image acquiring regions PL1, PL2, and PL3 do not coincide with each other with respect to the main scanning direction.

FIG. 9 is an explanatory view showing values of pixels represented by the forward scanning image signal components R and the backward scanning image signal components L representing the region 2 containing the contour line Co, which image signal components have been acquired in the state described above and stored in the image signal storing means 51 of the image information acquiring means 50. In FIG. 9, with respect to each of forward scanning image signal components R1, R2, and R3 and backward scanning image signal components L1, L2, and L3, the values of the pixels located in columns U1 to U10 extending in the sub-scanning direction in the corresponding image acquiring region, from which the image signal components have been acquired, are indicated by numerical values. As for each of the forward scanning image signal components R1, R2, and R3, the pixel having been read out firstly is the pixel located in the column U3, and the pixel having been read out lastly is the pixel located in the column U10. Also, as for each of the backward scanning image signal components L1, L2, and L3, the pixel having been read out firstly is the pixel located in the column U8, and the pixel having been read out lastly is the pixel located in the column U1.

In cases where the forward scanning image signal components R and the backward scanning image signal components L having thus been acquired in the state, in which the positions of the forward scanning image acquiring regions and the positions of the backward scanning image acquiring regions do not coincide with each other, are directly utilized for the reproduction of a visible image without being subjected to the smoothing operation processing, as illustrated in FIG. 10A, the positions of the first pixels, which are represented by the forward scanning image signal components R1, R2, and R3, and the positions of the last pixels, which are represented by the backward scanning image signal components L1, L2, and L3, are matched with each other with respect to the main scanning direction, and the visible image is reproduced from an image signal made up of the image signal components representing pixels located in an array of pixels constituted of columns V1 to V8. As illustrated in FIG. 10B, the visible image, which is reproduced from the image signal made up of the image signal components representing pixels located in the array of the pixels constituted of the columns V1 to V8, is composed of forward scanning image display regions QR1, QR2, and QR3 and backward scanning image display regions QL1, QL2, and QL3. Therefore, along each of the columns V2, V3, V6, and V7, the differences between the image densities of the forward scanning image display regions QR1, QR2, and QR3 and the image densities of the backward scanning image display regions QL1, QL2, and QL3 become large. As a result, the contour line Co is blurred with respect to the sub-scanning direction.

In this embodiment, in order to suppress the blurring of the contour line Co with respect to the sub-scanning direction, the smoothing operation processing is performed. How first operation processing is performed as the smoothing operation processing will be described hereinbelow. In the first operation processing, arithmetic mean calculation processing is performed on the forward scanning image signal components R and the backward scanning image signal components L and with respect to the sub-scanning direction in order to form the processed image signal G2.

Figures 11A, 11B:
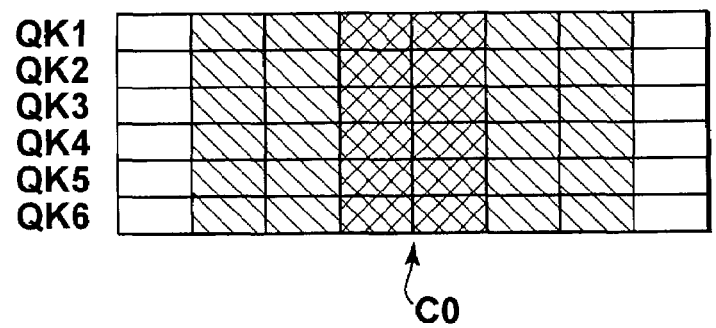
FIG. 11A is an explanatory view showing pixel values, which are obtained from first operation processing performed on the forward scanning image signal components and the backward scanning image signal components representing the pixels having been arrayed as shown in FIG. 10A.
FIG. 11B is an explanatory view showing image information reproduced from the pixel values, which have been obtained from the first operation processing performed on the forward scanning image signal components and the backward scanning image signal components.

With the first operation processing, the arithmetic mean calculation processing is performed on the forward scanning image signal components R1, R2, and R3 and the backward scanning image signal components L1, L2, and L3 shown in FIG. 10A and with respect to the sub-scanning direction. As a result, as illustrated in FIG. 11A, values of pixels representing processed image signal components K1 are obtained from the arithmetic mean calculation processing, which is performed on the forward scanning image signal components R1 and the backward scanning image signal components L1. Also, values of pixels representing processed image signal components K2 are obtained from the arithmetic mean calculation processing, which is performed on the backward scanning image signal components L1 and the forward scanning image signal components R2. Further, values of pixels representing processed image signal components K3 are obtained from the arithmetic mean calculation processing, which is performed on the forward scanning image signal components R2 and the backward scanning image signal components L2. Furthermore, values of pixels representing processed image signal components K4 are obtained from the arithmetic mean calculation processing, which is performed on the backward scanning image signal components L2 and the forward scanning image signal components R3. Also, values of pixels representing processed image signal components K5 are obtained from the arithmetic mean calculation processing, which is performed on the forward scanning image signal components R3 and the backward scanning image signal components L3. In this manner, as illustrated in FIG. 11A, the first processed image signal components K1, K2, K3, K4, K5, and K6 are formed.

As illustrated in FIG. 11B, image display regions QK1 to QK6, which are represented by the processed image signal made up of the first processed image signal components K1, K2, K3, K4, K5, and K6, are obtained such that the difference between the image densities of the image display regions adjacent to each other with respect to the sub-scanning direction is small as a whole. Therefore, in the thus obtained processed image, the blurring of the contour line Co with respect to the sub-scanning direction is suppressed, and the contour line Co is illustrated clearly.

How second operation processing is performed as the smoothing operation processing will be described hereinbelow. In the second operation processing, the values of the forward scanning image signal component R and the backward scanning image signal component L, which image signal components represent the pixels in the image information that are adjacent to each other in the sub-scanning direction, are compared with each other. Also, the value of the forward scanning image signal component R or the backward scanning image signal component L, whichever has a smaller value, is employed as the value of an image signal component of the processed image signal G2.

Figures 12A, 12B:
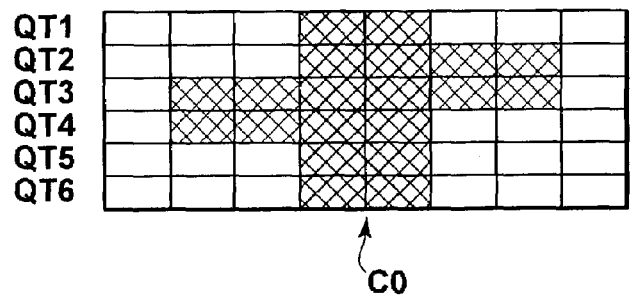
FIG. 12A is an explanatory view showing pixel values, which are obtained from second operation processing performed on the forward scanning image signal components and the backward scanning image signal components representing the pixels having been arrayed as shown in FIG. 10A.
FIG. 12B is an explanatory view showing image information reproduced from the pixel values, which have been obtained from the second operation processing performed on the forward scanning image signal components and the backward scanning image signal components.

With the second operation processing, as illustrated in FIG. 12A, values of pixels representing processed image signal components T1 are obtained from the comparison made between the forward scanning image signal components RI and the backward scanning image signal components Li shown in FIG. 10A. Also, values of pixels representing processed image signal components T2 are obtained from the comparison made between the backward scanning image signal components L1 and the forward scanning image signal components R2. Further, values of pixels representing processed image signal components T3 are obtained from the comparison made between the forward scanning image signal components R2 and the backward scanning image signal components L2. Furthermore, values of pixels representing processed image signal components T4 are obtained from the comparison made between the backward scanning image signal components L2 and the forward scanning image signal components R3. Also, values of pixels representing processed image signal components T5 are obtained from the comparison made between the forward scanning image signal components R3 and the backward scanning image signal components L3. In this manner, the values of the forward scanning image signal components R and the backward scanning image signal components L are compared with each other with respect to the sub-scanning direction, and the values of the forward scanning image signal components R or the backward scanning image signal components L, whichever have a smaller value, are employed as the values of the image signal components of the processed image signal G2. As a result, as illustrated in FIG. 12A, the second processed image signal components T1, T2, T3, T4, T5, and T6 are formed.

As illustrated in FIG. 12B, image display regions QT1 to QT6, which are represented by the processed image signal made up of the second processed image signal components T1, T2, T3, T4, T5, and T6 and stand side by side in the sub-scanning direction, are obtained such that the difference between the image densities of the image display regions adjacent to each other with respect to the sub-scanning direction is small, and such that the values of the pixels located along the columns V2, V3, V6, and V7 are small as a whole. Therefore, in the thus obtained processed image, the blurring of the contour line Co with respect to the sub-scanning direction is suppressed, and the contour line Co is illustrated clearly.

How third operation processing is performed as the smoothing operation processing will be described hereinbelow. In the third operation processing, the values of the forward scanning image signal component R and the backward scanning image signal component L, which image signal components represent the pixels in the image information that are adjacent to each other in the sub-scanning direction, are compared with each other. Also, the value of the forward scanning image signal component R or the backward scanning image signal component L, whichever has a smaller value, is employed as the value of one of line image signal components, which correspond to a line extending in the main scanning direction on the image carrier 1. In this manner, a plurality of sets of the line image signal components, which sets correspond to a plurality of lines extending in the main scanning direction and standing side by side with respect to the sub-scanning direction, are formed. Also, the line image signal components, which correspond to an odd-numbered line, as counted in the sub-scanning direction, are employed as image signal components of the processed image signal, which image signal components correspond to an odd-numbered line in an array of pixels in a processed image represented by the processed image signal. Further, the arithmetic mean calculation processing is performed on two sets of the line image signal components, which sets correspond to two odd-numbered lines lying on both sides of an even-numbered line, and with respect to the sub-scanning direction. Furthermore, the image signal components, which have thus been obtained from the arithmetic mean calculation processing, are employed as image signal components of the processed image signal, which image signal components correspond to an even-numbered line in the array of the pixels in the processed image represented by the processed image signal.

Figures 13A, 13B:
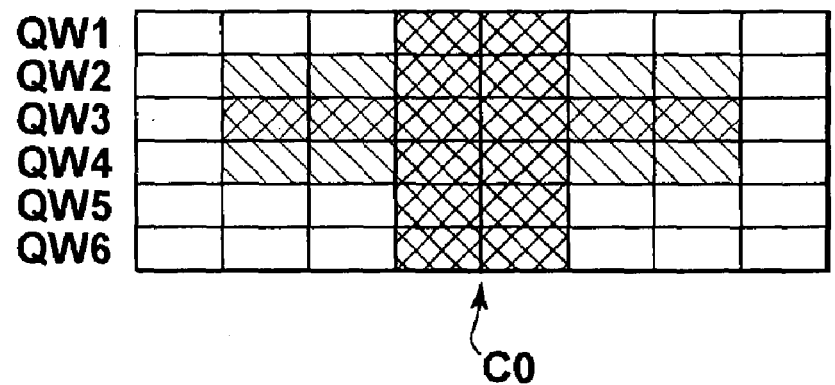
FIG. 13A is an explanatory view showing pixel values, which are obtained from third operation processing performed on the forward scanning image signal components and the backward scanning image signal components representing the pixels having been arrayed as shown in FIG. 10A.
FIG. 13B is an explanatory view showing image information reproduced from the pixel values, which have been obtained from the third operation processing performed on the forward scanning image signal components and the backward scanning image signal components.

As the line image signal components, the second processed image signal components T1, T2, T3, T4, T5, T6, ... standing side by side in the sub-scanning direction as illustrated in FIG. 12A, which image signal components are formed from the aforesaid second operation processing performed on the forward scanning image signal components R1, R2, R3, ... and the backward scanning image signal components L1, L2, L3, ..., are obtained. Also, as illustrated in FIG. 13A, the second processed image signal components T1, T3, and T5, which are among the second processed image signal components T1, T2, T3, T4, T5, T6, are employed respectively as third processed image signal components W1, W3, and W5. Further, third processed image signal components W2 are formed from the arithmetic mean calculation processing, which is performed on the second processed image signal components T1 and the second processed image signal components T3 and with the formula W2=(T1+T3)/2. Furthermore, third processed image signal components W4 are formed from the arithmetic mean calculation processing, which is performed on the second processed image signal components T3 and the second processed image signal components T5 and with the formula W4=(T3+T5)/2. Also, third processed image signal components W6 are formed from the arithmetic mean calculation processing, which is performed on the second processed image signal components T5 and second processed image signal components T7 and with the formula W6=(T5+T7)/2.

In the manner described above, as illustrated in FIG. 13A, the third processed image signal components W1, W2, W3, W4, W5, and W6 are formed. As illustrated in FIG. 13B, image display regions QW1 to QW6, which are represented by the processed image signal made up of the third processed image signal components W1, W2, W3, W4, W5, and W6 and stand side by side in the sub-scanning direction, are obtained such that the difference in image density between the pixels located along each of the columns V2, V3, V6, and V7 in the array of the pixels in the processed image represented by the processed image signal made up of the third processed image signal components W1, W2, W3, W4, W5, and W6, which pixels are adjacent to each other with respect to the sub-scanning direction, is suppressed even further, and such that the values of the pixels located along the columns V2, V3, V6, and V7 becomes small even further as a whole. Therefore, in the thus obtained processed image, the blurring of the contour line Co with respect to the sub-scanning direction is suppressed, and the contour line Co is illustrated more clearly.

In the embodiments described above, the stimulating ray source 5 and the photoelectric conversion means 20 are located on the optical head 10. The optical head 10, the stimulating ray source 5, and the photoelectric conversion means 20 are thus combined into an integral body. However, in cases where the traveling of the stimulating rays Le between the stimulating ray source 5 and the optical head 10 and the traveling of the fluorescence Ke between the optical head 10 and the photoelectric conversion means 20 are performed through parallel optical paths, the distance between the stimulating ray source 5 and the photoelectric conversion means 20 is capable of being altered. Therefore, the stimulating ray source 5 and the photoelectric conversion means 20 may be located on the sub-scanning means 40 or on the base on which the image carrier 1 is supported. Also, the optical head 10 may be kept stationary, and the image carrier 1 may be moved for the reciprocal scanning in the main scanning direction and moved in the sub-scanning direction, which intersects with the main scanning direction. In this manner, the fluorescence Ke produced by the image carrier 1 may be photoelectrically converted into the electric image signal.

Also, in the embodiments described above, the stimulating rays Le are irradiated to the image carrier 1, and the fluorescence Ke produced by the image carrier 1 is received by the photoelectric conversion means 20. Alternatively, besides the light emitted by the image carrier 1, the light to be received by the photoelectric conversion means 20 may be the light having been reflected by the image carrier 1, the light having passed through the image carrier 1, or the like. In cases where the light having been reflected by the image carrier 1 or the light having passed through the image carrier 1 is received by the photoelectric conversion means 20, the irradiation of the stimulating rays Le onto the image carrier 1 need not be performed.

Further, in the embodiments described above, the optical head 10 is utilized as the scanning means. Alternatively, the read-out image processing apparatus in accordance with the present invention may be constituted in the manner described below. Specifically, a light beam may be employed as the scanning means, and the photoelectric conversion means may be constituted of a photomultiplier for performing the photoelectric conversion of the light coming from the image carrier, which carries the image information thereon, in order to acquire the electric image signal, which represents the image information carried on the image carrier. Also, the reciprocal main scanning means may be constituted of a galvanometer mirror, or the like, for moving the light beam for the reciprocal scanning with respect to the image carrier and in the main scanning direction, and the sub-scanning means may move the light beam with respect to the image carrier and in the sub-scanning direction, which intersects with the main scanning direction. Further, the image information acquiring means may perform operations for:

actuating the galvanometer mirror to move the light beam for the reciprocal scanning with respect to the image carrier and in the main scanning direction, actuating the sub-scanning means to move the light beam with respect to the image carrier and in the sub-scanning direction, and actuating the photomultiplier to perform the photoelectric conversion of the light, which comes from the image carrier, in order to acquire the electric image signal, which represents the image information carried on the image carrier. Furthermore, the smoothing operation processing may be performed on the forward scanning image signal components and the backward scanning image signal components, which have been acquired respectively in the forward scanning stage and the backward scanning stage consecutive in the reciprocal scanning, and with respect to the sub-scanning direction, and the smoothing-processed image signal, which represents the image information, may thus be formed with the smoothing operation processing.

What is claimed is:

1. A method of processing a read-out image, comprising the steps of:

i) moving scanning means for reciprocal scanning with respect to an image carrier, which carries image information thereon, and in a main scanning direction, ii) moving the scanning means with respect to the image carrier and in a sub-scanning direction, which intersects with the main scanning direction, and iii) performing photoelectric conversion of light, which comes from the image carrier, an electric image signal, which represents the image information carried on the image carrier, being acquired from the photoelectric conversion, wherein smoothing operation processing is performed on forward scanning image signal components and backward scanning image signal components, which have been acquired respectively in a forward scanning stage and a backward scanning stage consecutive in the reciprocal scanning, and with respect to the sub-scanning direction, a processed image signal, which represents the image information, being formed with the smoothing operation processing.

2. A method as defined in claim 1 wherein the smoothing processing is arithmetic mean calculation processing performed on the forward scanning image signal components and the backward scanning image signal components and with respect to the sub-scanning direction, and p1 the processed image signal, which represents the image information, is formed with the arithmetic mean calculation processing.

3. A method as defined in claim 1 wherein the smoothing operation processing is operation processing for:

comparing values of a forward scanning image signal component and a backward scanning image signal component, which image signal components represent pixels in the image information that are adjacent to each other in the sub-scanning direction, with each other, and employing the value of the forward scanning image signal component or the backward scanning image signal component, whichever has a small value, as the value of an image signal component of the processed image signal.

4. A method according to claim 1, comprising suppressing a difference between the values of the forward scanning image signal component and the backward scanning image signal component.

5. A method according to claim 1, wherein reciprocating scanning is forward movement of the scanning means, in the main scanning direction, with no movement in the sub-scanning direction.

6. A method according to claim 1, wherein reciprocating scanning is backward movement of the scanning means, in the main scanning direction, with no movement in the sub-scanning direction.

7. A method according to claim 1, wherein moving the scanning means in the sub-scanning direction is perpendicular to moving the scanning means, for reciprocating scanning, in the main scanning direction.

8. A method according to claim 1, having movement in the forward direction being followed by movement in the sub-scanning direction, being followed by movement in the backward direction.

9. An apparatus for processing a read-out image, comprising:

i) an optical head for receiving light coming from an image carrier, which carries image information thereon, ii) photoelectric conversion means for performing photoelectric conversion of the light, which has traveled through the optical head, in order to acquire an electric image signal, which represents the image information carried on the image carrier, iii) reciprocal main scanning means for moving the optical head for reciprocal scanning with respect to the image carrier and in a main scanning direction, iv) sub-scanning means for moving the optical head with respect to the image camer and in a sub-scanning direction, which intersects with the main scanning direction, and v) image information acquiring means for:

actuating the reciprocal main scanning means to move the optical head for the reciprocal scanning with respect to the image carrier and in the main scanning direction, actuating the sub-scanning means to move the optical head with respect to the image carrier and in the sub-scanning direction, and actuating the photoelectric conversion means to perform the photoelectric conversion of the light coming from the image carrier, which light has traveled through the optical head, in order to acquire the electric image signal, which represents the image information carried on the image carrier, wherein the apparatus further comprises operation processing means for performing smoothing operation processing on forward scanning image signal components and backward scanning image signal components, which have been acquired respectively in a forward scanning stage and a backward scanning stage consecutive in the reciprocal scanning, and with respect to the sub-scanning direction in order to form a processed image signal, which represents the image information.

10. An apparatus as defined in claim 9, wherein the smoothing operation processing, which is performed by the operation processing means, is arithmetic mean calculation processing performed on the forward scanning image signal components and the backward scanning image signal components and with respect to the sub-scanning direction, and the processed image signal, which represents the image information, is formed with the arithmetic mean calculation processing.

11. An apparatus as defined in claim 9, wherein the smoothing operation processing, which is performed by the operation processing means, is operation processing for:

comparing values of a forward scanning image signal component and a backward scanning image signal component, which image signal components represent pixels in the image information that are adjacent to each other in the sub-scanning direction, with each other, and employing the value of the forward scanning image signal component or the backward scanning image component, whichever has a smaller value, as the value of an image signal component of the processed image signal.

12. An apparatus for processing a read-out image, comprising:

an optical head for receiving light coming from an image carrier, which carries image information thereon;

photoelectric conversion means for performing photoelectric conversion of the light. which has traveled through the optical head, in order to acquire an electric image signal, which represents the image information carried on the image carrier;

reciprocal main scanning means for moving the optical head for reciprocal scanning with respect to the image carrier and in a main scanning direction;

sub-scanning means for moving the optical head with respect to the image carrier and in a sub-scanning direction, which intersects with the main scanning direction;

image information acquiring means for:
 actuating the reciprocal main scanning means to move the optical head for the reciprocal scanning with respect to the image carrier and in the main scanning direction,
 actuating the sub-scanning means to move the optical head with respect to the image carrier and in the sub-scanning direction, and
 actuating the photoelectric conversion means to perform the photoelectric conversion of the light coming from the image carrier, which light has traveled through the optical head, in order to acquire the electric image signal, which represents the image information carried on the image carrier; and operation processing means for performing smoothing operation processing on forward scanning image signal components and backward scanning image signal components, which have been acquired respectively in a forward scanning stage and a backward scanning stage consecutive in the reciprocal scanning, and with respect to the sub-scanning direction in order to form a processed image signal, which represents the image information, wherein the smoothing operation processing, which is performed by the operation processing means, is operation processing for:

comparing values of a forward scanning image signal component and a backward scanning image signal component, which image signal components represent pixels in the image information that are adjacent to each other in the sub-scanning direction, with each other, employing the value of the forward scanning image signal component or the backward scanning image signal component, whichever has a smaller value, as the value of one of line image signal components, which correspond to a line extending in the main scanning direction, a plurality of sets of the line image signal components, which sets correspond to a plurality of lines extending in the main scanning direction and standing side by side with respect to the sub-scanning direction, being thereby formed, employing the line image signal components, which correspond to an odd-numbered line, as counted in the sub-scanning direction, as image signal components of the processed image signal, which image signal components correspond to an odd-numbered line in an array of pixels in a processed image represented by the processed image signal, performing arithmetic mean calculation processing on two sets of the line image signal components, which sets correspond to two odd-numbered lines lying on both sides of an even-numbered line, with respect to the sub-scanning direction, and employing the image signal components, which have thus been obtained from the arithmetic mean calculation processing, as image signal components of the processed image signal, which image signal components correspond to an even-numbered line in the array of the pixels in the processed image represented by the processed image signal.

13. A method of processing a read-out image, comprising the steps of:

moving scanning means for reciprocal scanning with respect to an image carrier, which carries image information thereon, and in a main scanning direction;

moving the scanning means with respect to the image carrier and in a sub-scanning direction, which intersects with the main scanning direction;

performing photoelectric conversion of light, which comes from the image carrier, an electric image signal, which represents the image information carried on the image carrier, being acquired from the photoelectric conversion; and performing smoothing operation processing on forward scanning image signal components and backward scanning image signal components, which have been acquired respectively in a forward scanning stage and a backward scanning stage consecutive in the reciprocal scanning, and with respect to the sub-scanning direction, a processed image signal, which represents the image information, being formed with the smoothing operation processing, wherein, the smoothing operation processing is operation processing for:

comparing values of a forward scanning image signal component and a backward scanning image signal component, which image signal components represent pixels in the image information that are adjacent to each other in the sub-scanning direction, with each other, employing the value of the forward scanning image signal component or the backward scanning image signal component, whichever has a small value, as the value of one line image signal components, which correspond to a line extending in the main scanning direction, a plurality of sets of line image signal components, which sets correspond to a plurality of lines extending in the main scanning direction and standing side by side with respect to the sub-scanning direction, being thereby formed, employing the line image signal components, which correspond to an odd-numbered line, as counted in the sub-scanning direction, as image signal components of the processed image signal, which image signal components correspond to an odd-numbered line in an array of pixels in a processed image represented by the processed image signal, performing arithmetic mean calculation processing on two sets of the line image signal components, which sets correspond to two odd-numbered lines lying on both sides of an even-numbered line, and with respect to the sub-scanning direction, and employing the image signal components, which have thus been obtained from the arithmetic mean calculation processing, as image signal components correspond to an even-numbered line in the array of pixels in the processed signal.

14. An apparatus for processing a read-out image comprising:
- i) photoelectric conversion means for performing photoelectric conversion of light coming from an image carrier, which carries image information thereon, in order to acquire an electric image signal, which represents the image information carried on the image carrier,
- ii) reciprocal main scanning means for moving scanning means for reciprocal scanning with respect to the image carrier and in a main scanning direction,
- iii) sub-scanning means for moving the scanning means with respect to the image carrier and in a sub-scanning, which intersects with the main scanning direction, and
- iv) image information acquiring means for:
  - actuating the reciprocal main scanning means to move the scanning means for the reciprocal scanning means for the reciprocal scanning with respect to the image carrier and in the main scanning direction,
  - actuating the sub-scanning means to move the scanning means with respect to the image carrier and in the sub-scanning direction, and
  - actuating the photoelectric conversion means to perform the photoelectric conversion of the light, which comes from the image carrier, in order to acquire the electric image signal, which represents the image information carried on the image carrier,
- wherein the apparatus further comprises operation processing means for performing smoothing operation processing on forward scanning image signal components and backward scanning image signal components, which have been acquired respectively in a forward scanning stage and a backward scanning stage consecutive in the reciprocal scanning, and with respect to the sub-scanning direction in order to form a processed image signal, which represents the image information.

15. An apparatus as defined in claim 14, wherein the smoothing operation processing, which is performed by the operation processing means, is arithmetic mean calculation processing performed on the forward scanning image signal components and the backward scanning image signal components and with respect to the sub-scanning direction, and
the processed image signal, which represents the image information, is formed with the arithmetic mean calculation processing.

16. An apparatus as defined in claim 14, wherein the smoothing operation processing, which is performed by the operation processing means, is operation processing for:
- comparing values of a forward scanning image signal component and a backward scanning image signal component, which image signal components represent pixels in the image information that are adjacent to each other in the sub-scanning direction, with each other, and
- employing the value of the forward scanning image signal component or the backward scanning image signal component, whichever has a smaller value, as the value of an image signal component of the processed image signal.

17. An apparatus for processing a read-out image comprising:
- photoelectric conversion means for performing photoelectric conversion of light coming from an image carrier, which carries image information thereon, in order to acquire an electric image signal, which represents the image information carried on the image carrier;
- reciprocal main scanning means for moving scanning means for reciprocal scanning with respect to the image carrier and in a main scanning direction;
- sub-scanning means for moving the scanning means with respect to the image carrier and in a sub-scanning, which intersects with the main scanning direction;
- image information acquiring means for:
  - actuating the reciprocal main scanning means to move the scanning means for the reciprocal scanning means for the reciprocal scanning with respect to the image carrier and in the main scanning direction.
  - actuating the sub-scanning means to move the scanning means with respect to the image carrier and in the sub-scanning direction, and
  - actuating the photoelectric conversion means to perform the photoelectric conversion of the light, which comes from the image carrier, in order to acquire the electric image signal, which represents the image information carried on the image carrier; and
- operation processing means for performing smoothing operation processing on forward scanning image signal components and backward scanning image signal components, which have been acquired respectively in a forward scanning stage and a backward scanning stage consecutive in the reciprocal scanning, and with respect to the sub-scanning direction in order to form a processed image signal, which represents the image information,
- wherein the smoothing operation processing, which is performed by the operation processing means, is operation processing for:
- comparing values of a forward scanning image signal component and a backward scanning image signal component, which image signal components represent pixels in the image information that are adjacent to each other in the sub-scanning direction, with each other,
- employing the value of the forward scanning image signal component or the backward scanning image signal component, whichever has a smaller value, as the value of one of line image signal components, which correspond to a line extending in the main scanning direction, a plurality of sets of the line image signal components, which sets correspond to a plurality of lines extending in the main scanning direction and standing side by side with respect to the sub-scanning direction, being thereby formed,
- employing the line image signal components, which correspond to an odd-numbered line, as counted in the sub-scanning direction, as image signal components of the processed image signal, which image signal components correspond to an odd-numbered line in an array of pixels in a processed image represented by the processed image signal,
- performing arithmetic mean calculation processing on two sets of the line image signal components, which sets correspond to two odd-numbered lines lying on both sides of an even-numbered line, and with respect to the sub-scanning direction, and
- employing the image signal components, which have thus been obtained from the arithmetic mean calculation processing, as image signal components of the processed image signal, which image signal components correspond to an even-numbered line in the array of the pixels in the processed image represented by the processed image signal.

* * * * *